R. M. GEYER.
AUTOMATIC SAFETY CONTROL FOR CINEMATOGRAPH AND LIKE MACHINES.
APPLICATION FILED MAY 28, 1919.

1,384,947.

Patented July 19, 1921.
13 SHEETS—SHEET 1.

INVENTOR
ROY MARCUS GEYER
PER:- Rayner &c
ATTORNEYS.

R. M. GEYER.
AUTOMATIC SAFETY CONTROL FOR CINEMATOGRAPH AND LIKE MACHINES.
APPLICATION FILED MAY 28, 1919.
1,384,947.
Patented July 19, 1921.
13 SHEETS—SHEET 2.
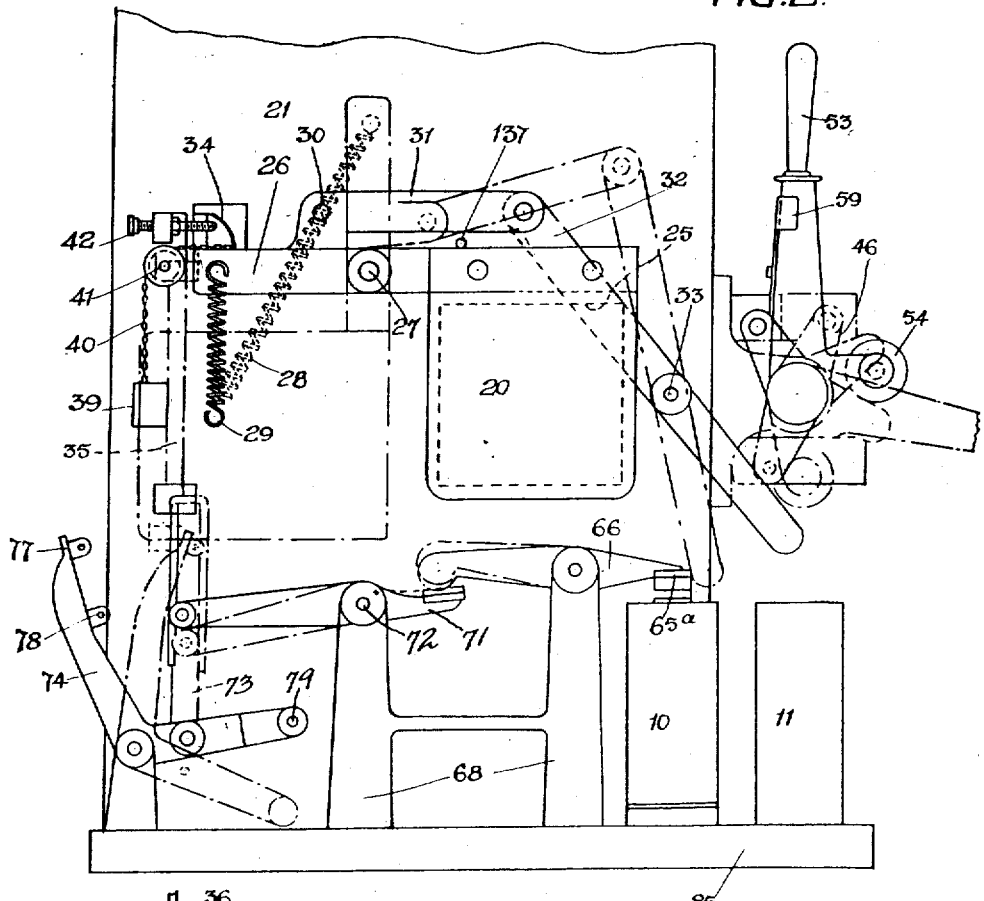
Fig. 2.
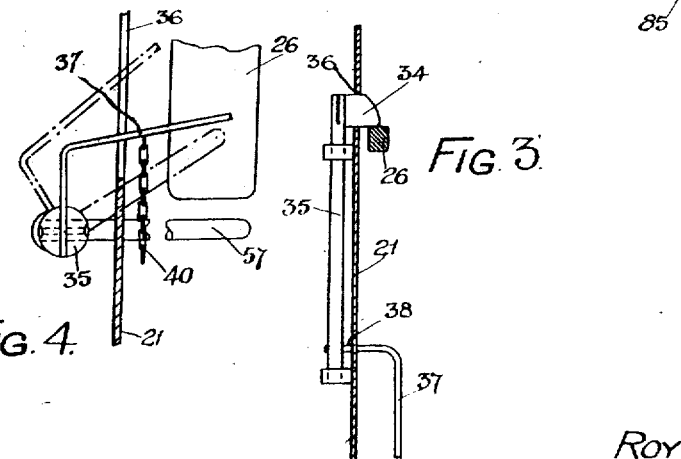
Fig. 3.
Fig. 4.
INVENTOR
ROY MARCUS GEYER
PER:-
Rayner & Co
ATTORNEYS.

R. M. GEYER.
AUTOMATIC SAFETY CONTROL FOR CINEMATOGRAPH AND LIKE MACHINES.
APPLICATION FILED MAY 28, 1919.
1,384,947.
Patented July 19, 1921.
13 SHEETS—SHEET 3.
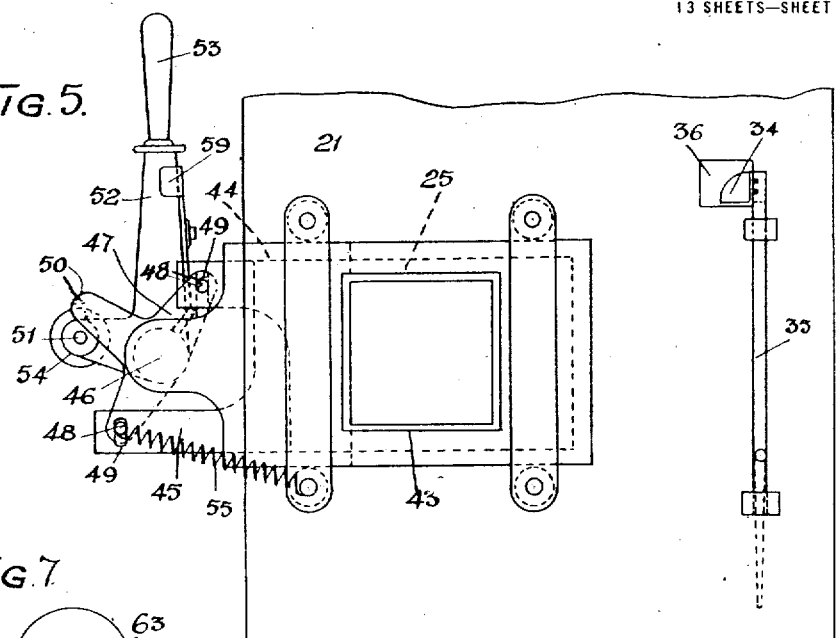
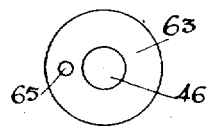
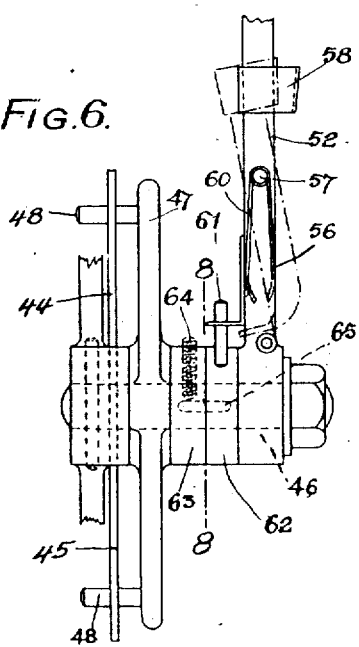
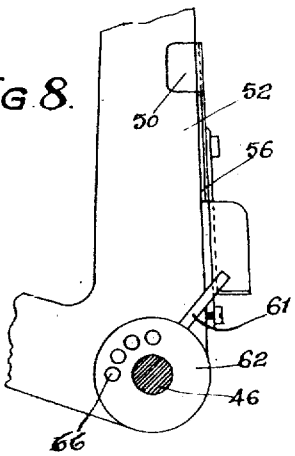
INVENTOR
ROY MARCUS GEYER
PER:- Rayner & Co
ATTORNEYS

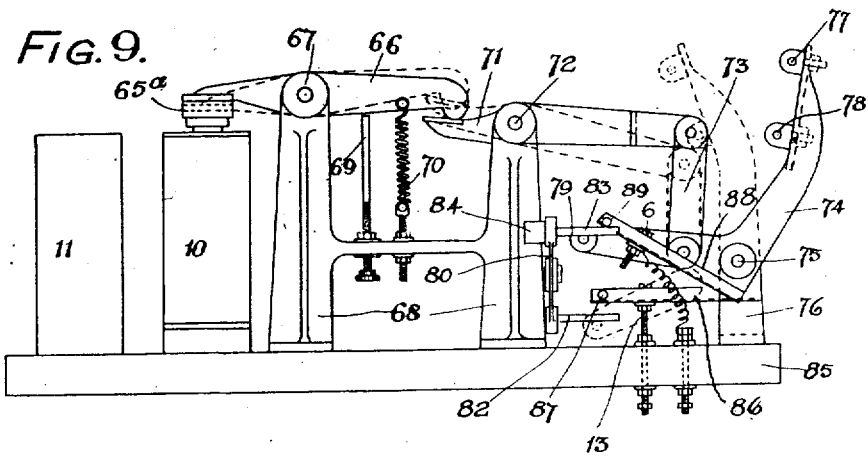
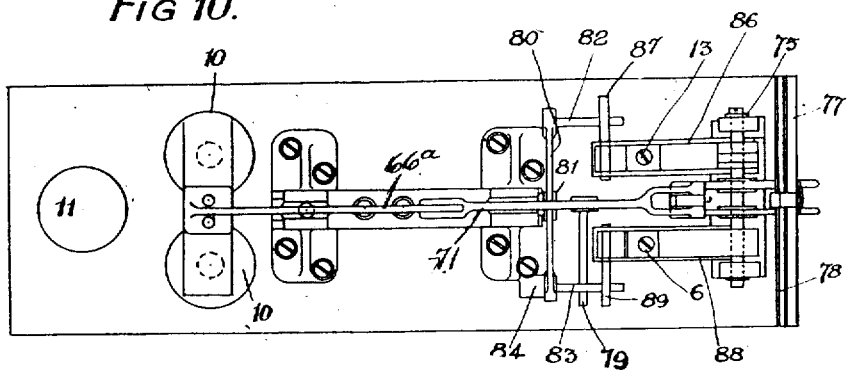
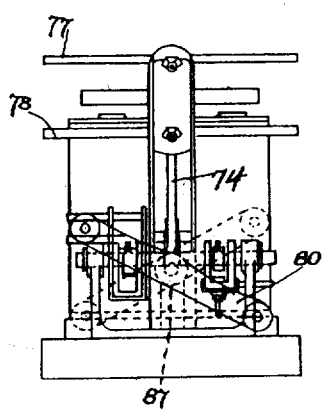

R. M. GEYER.
AUTOMATIC SAFETY CONTROL FOR CINEMATOGRAPH AND LIKE MACHINES.
APPLICATION FILED MAY 28, 1919.

1,384,947.

Patented July 19, 1921.
13 SHEETS—SHEET 5.

INVENTOR
ROY MARCUS GEYER
PER:-
Rayner &/o
ATTORNEYS

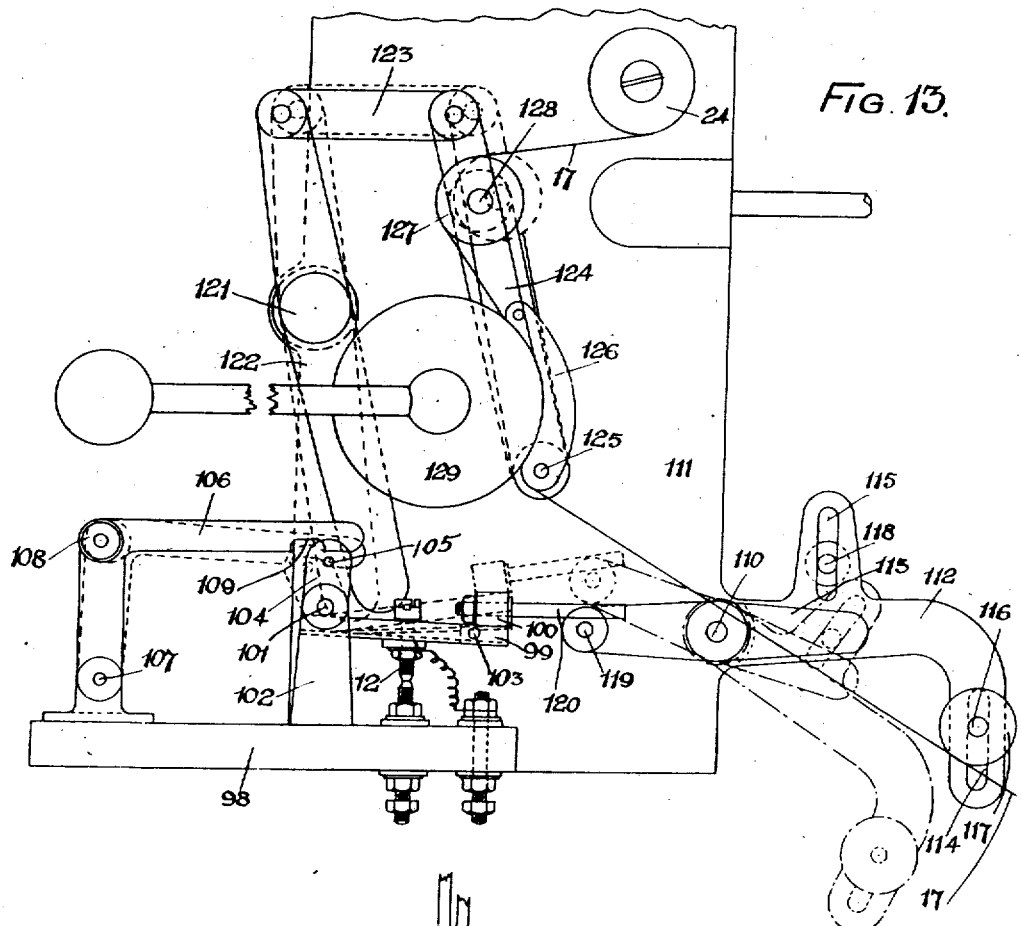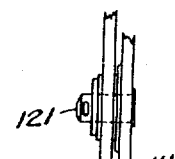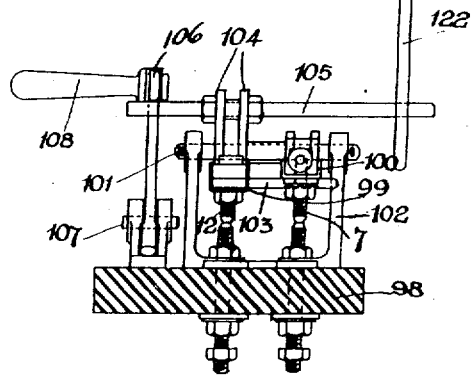

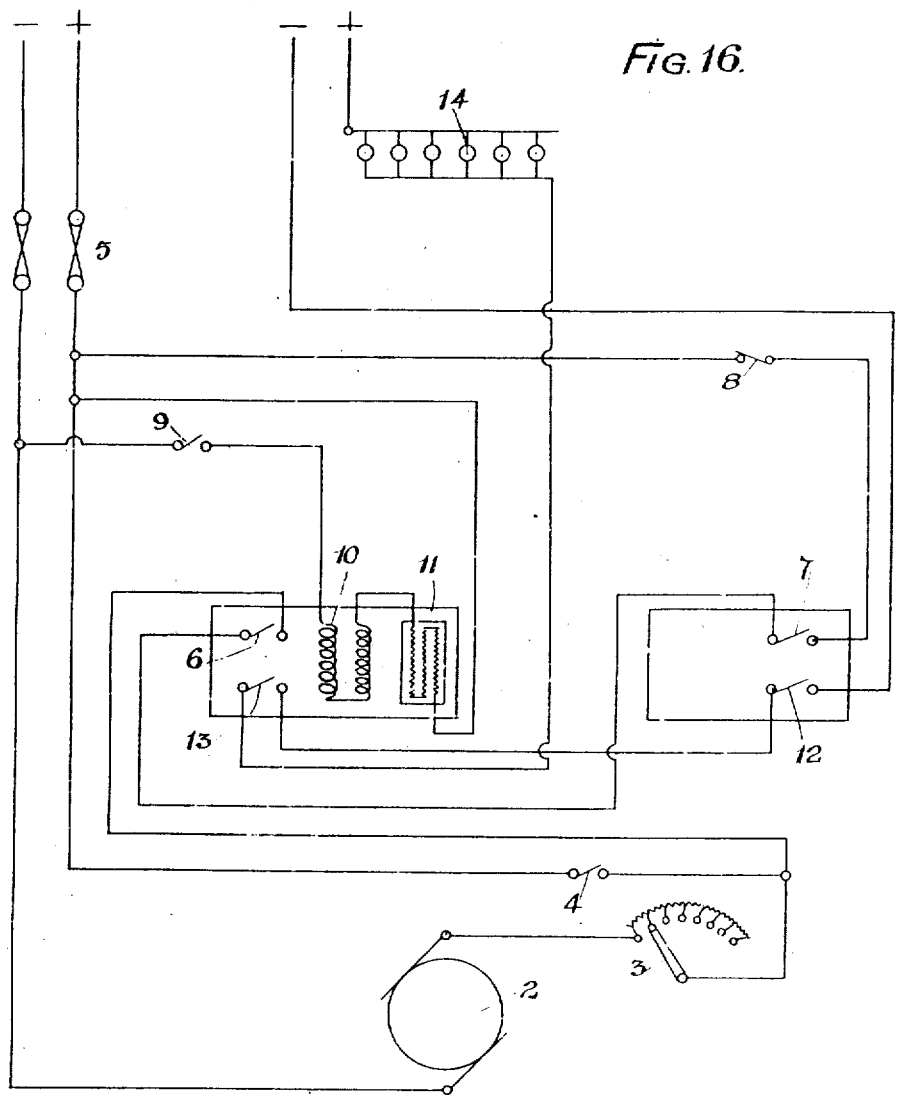

R. M. GEYER.
AUTOMATIC SAFETY CONTROL FOR CINEMATOGRAPH AND LIKE MACHINES.
APPLICATION FILED MAY 28, 1919.
1,384,947.
Patented July 19, 1921.
13 SHEETS—SHEET 9.
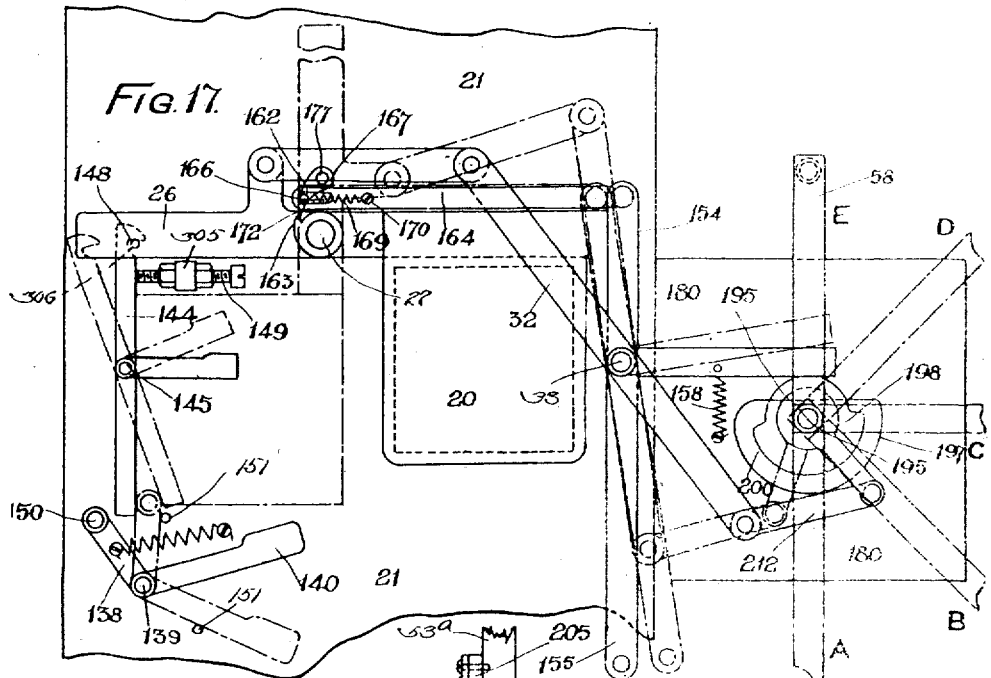
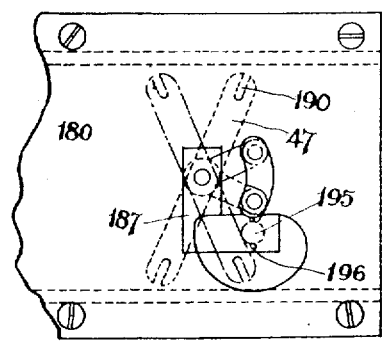
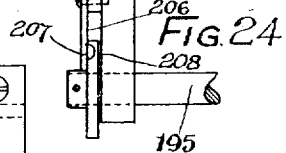
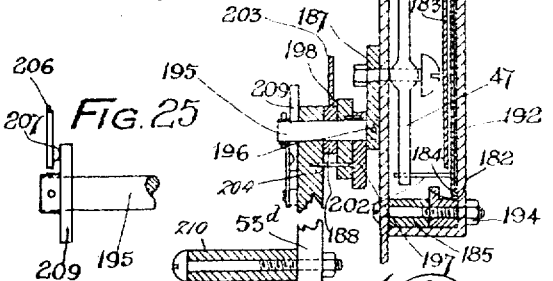
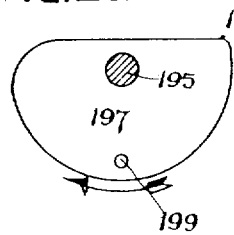
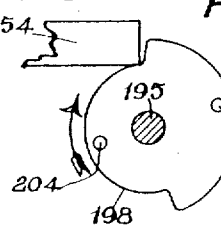
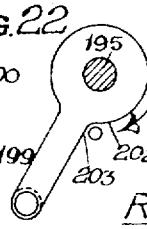
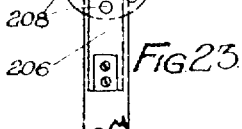
INVENTOR
ROY MARCUS GEYER
PER:- Rayner &c
ATTORNEYS R. M. GEYER.
AUTOMATIC SAFETY CONTROL FOR CINEMATOGRAPH AND LIKE MACHINES.
APPLICATION FILED MAY 28, 1919.
1,384,947.
Patented July 19, 1921.
13 SHEETS—SHEET 10.
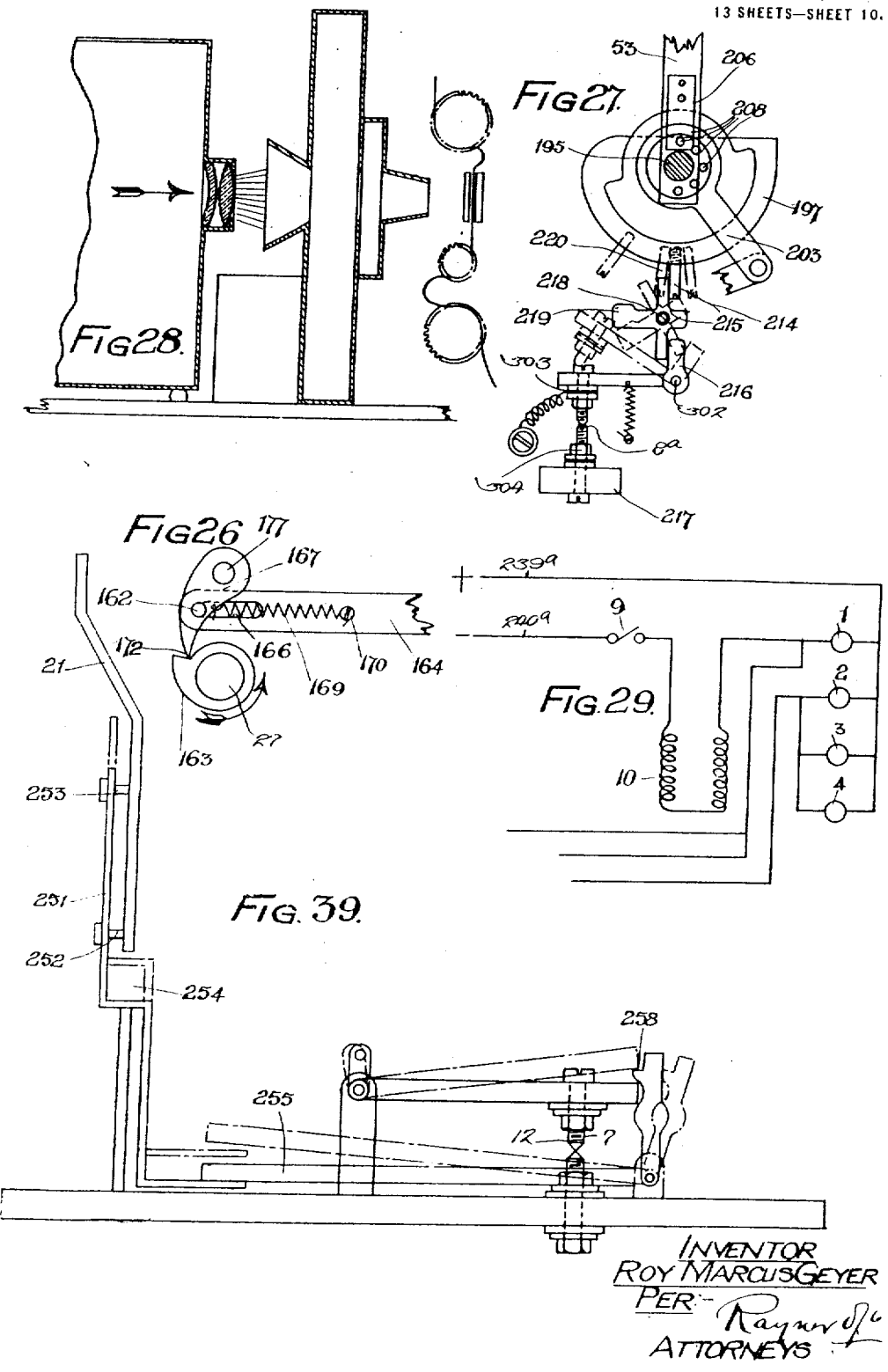

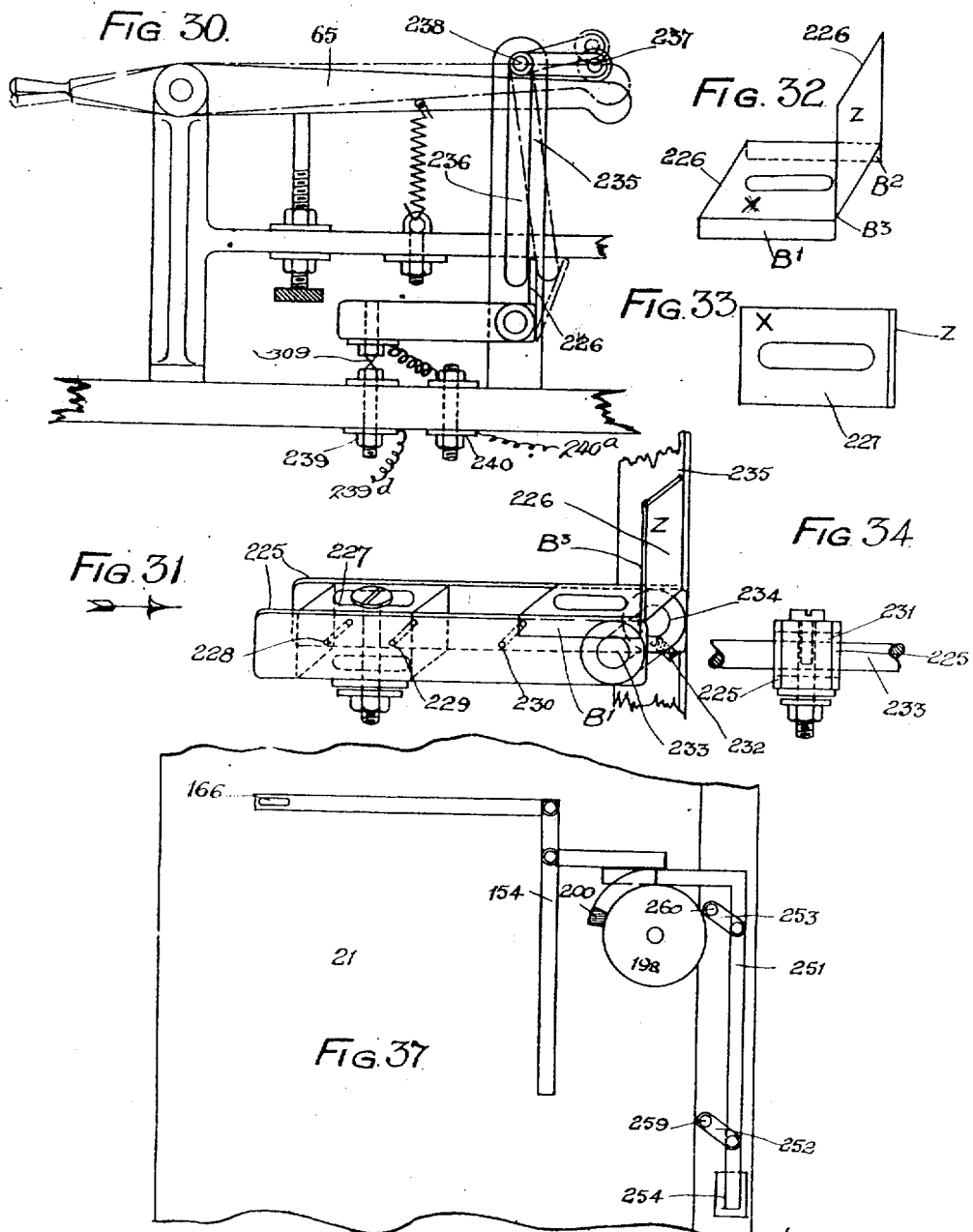

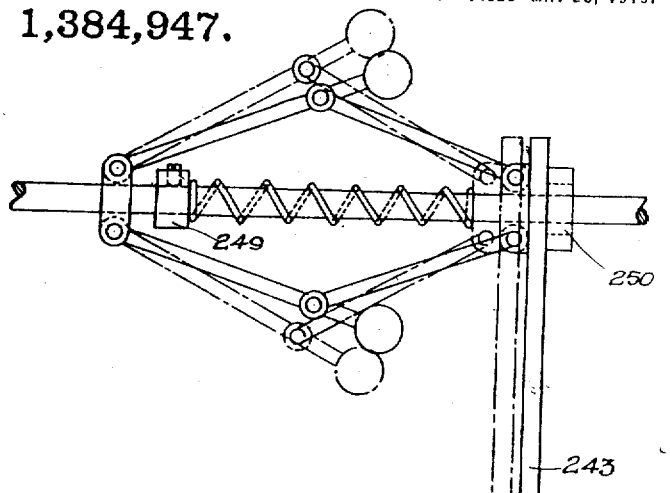
FIG. 35.
FIG. 36.
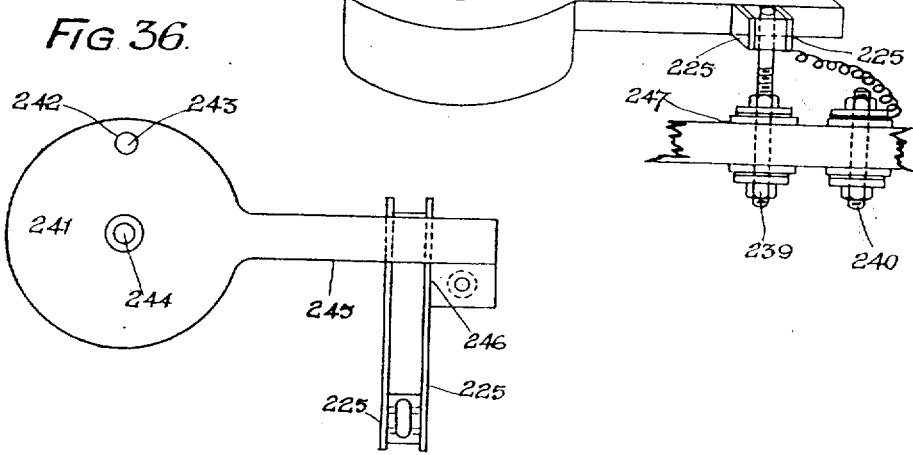
FIG. 38.
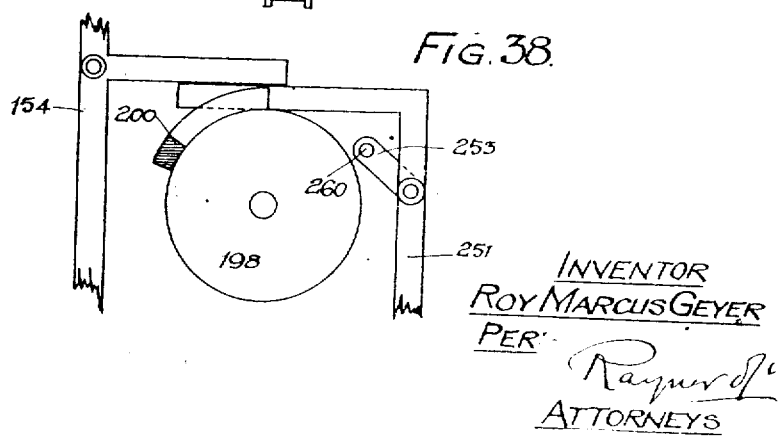
INVENTOR
ROY MARCUS GEYER
PER
ATTORNEYS

UNITED STATES PATENT OFFICE.

ROY MARCUS GEYER, OF PICTURE PALACE, MUSSOORIE, INDIA.

AUTOMATIC SAFETY CONTROL FOR CINEMATOGRAPH AND LIKE MACHINES.

1,384,947.                     Specification of Letters Patent.     Patented July 19, 1921.

Application filed May 28, 1919. Serial No. 300,460.

*To all whom it may concern:*

Be it known that I, ROY MARCUS GEYER, subject of the King of Great Britain and Ireland, residing at Picture Palace, Mussoorie, India, have invented certain new and useful Improvements in Automatic Safety Control for Cinematograph and like Machines, of which the following is a specification.

This invention relates to automatic-safety control for cinematograph and like machines and has for its primary object the provision of means in this class of machine rendering it impossible for the rays of light to reach the film if at any time the film should be stationary.

A secondary object of the invention is to provide means whereby the rays of light from the projecting machine will be automatically cut off from the screen when reaching the end of a film.

The circumstances in which the film may be stationary in the machine when the light is on, may be briefly summarized as follows:—

(1). When the driving belt comes off or breaks.

(2). When a defect develops in the motor such as the seizing of bearings.

(3). When a defect develops in the projecting machine such as the seizing of its bearings.

(4). When the motor circuit fuse blows.

(5). When the film breaks below the gate.

(6). When the film has a few perforations torn upon each side so that the intermittent sprocket is unable to move it.

(7). When a fresh film has just been put in the machine and before the machine has been started.

Further my apparatus will operate to cut off the light rays from the film when the take-up spool fails to take up the film coming away from the machine.

According to my invention I provide between the light and the film gate, a safety shutter which is normally locked in a position in which it prevents the light rays from reaching the film, and locking mechanism which normally prevents said shutter from being moved, and automatic means for unlocking said locking mechanism which means operates only when the film has reached a certain predetermined speed.

A second shutter hereinafter called the intermediate shutter capable of cutting off the light rays from the film is provided adjacent to the safety shutter. Mechanism controlling the movement of these two shutters is provided, and is so arranged that, before the safety shutter can be opened, the film must have reached a predetermined speed of travel through the gate and the intermediate shutter must be closed. When this control mechanism has been operated to open the safety shutter, the motion of the control mechanism is reversed and the intermediate shutter is opened.

Mechanism is provided whereby whenever the film becomes stationary in the machine and the light is on, the safety shutter will close automatically, and become locked automatically.

My invention also comprises means for controlling the lights of the hall in which the machine is being used, this light controlling mechanism being arranged so that the hall lights are automatically cut off when the projecting machine is operating satisfactorily and so that the hall lights are automatically restored in the case of certain selected stoppages.

In order to carry out the secondary object of my invention, I provide a third shutter hereinafter called the lens shutter adapted to cover the front of the lens so as to cut off the light from the screen just prior to the termination of a film. Other objects of my invention will be apparent from the following description.

The accompanying drawings illustrate by way of example one method of carrying my invention into practice.

Fig. 2 is a view looking in the direction of the arrow on Fig. 1 showing the safety shutter and its controlling mechanism.

Fig. 3 is a side view of the locking device for the safety shutter.

Fig. 4 is a plan view of said locking device.

Fig. 5 is a view looking in a direction opposite to the arrow in Fig. 1 showing the intermediate shutter.

Fig. 6 is a side view of the controlling mechanism for the safety and intermediate shutters.

Fig. 7 shows a detail of the mechanism shown in Fig. 6.

Fig. 8 is a sectional view on line 8—8 of Fig. 6.

Fig. 9 is a view looking opposite to the arrow (Fig. 1) showing two of the switches and their magnetic controlling device.

Fig. 10 is a plan view corresponding with Fig. 9.

Fig. 11 is an end view corresponding with Fig. 9.

Fig. 13 is a side view of two of the switches and their operating means.

Fig. 14 is a fragmentary end view corresponding with Fig. 13.

Fig. 16 is the wiring diagram.

Fig. 17 is a view looking in the direction of the arrow on Fig. 1.

Fig. 18 is a sectional side elevation of the operating mechanism for the safety and intermediate shutters.

Fig. 19 is a front elevation corresponding to Fig. 18.

Figs. 20 to 25 are fragmentary views showing details.

Fig. 26 is a front view of one of the locking devices for the safety shutter.

Fig. 27 is a similar view to Fig. 17 showing a portion of the mechanism to an enlarged scale.

Fig. 28 is a diagram showing the complete apparatus.

Fig. 29 shows a modification to the wiring diagram shown in Fig. 16.

Fig. 30 shows a modification to the apparatus shown in Fig. 9.

Fig. 31 is a perspective view of the switch illustrated in Fig. 30.

Figs. 32, 33 and 34 are views showing details of the switch.

Fig. 35 is a perspective view showing an improved form of governor switch.

Fig. 36 is a plan of the improved governor switch.

Fig. 37 is a fragmentary view in front elevation of a portion of the apparatus for releasing the switches denoted 7 and 10.

Fig. 38 shows a portion of the apparatus shown in Fig. 37 to an enlarged scale.

Fig. 39 shows a modified form of the catch mechanism operating in conjunction with the switches 7 and 12.

Figure 1:
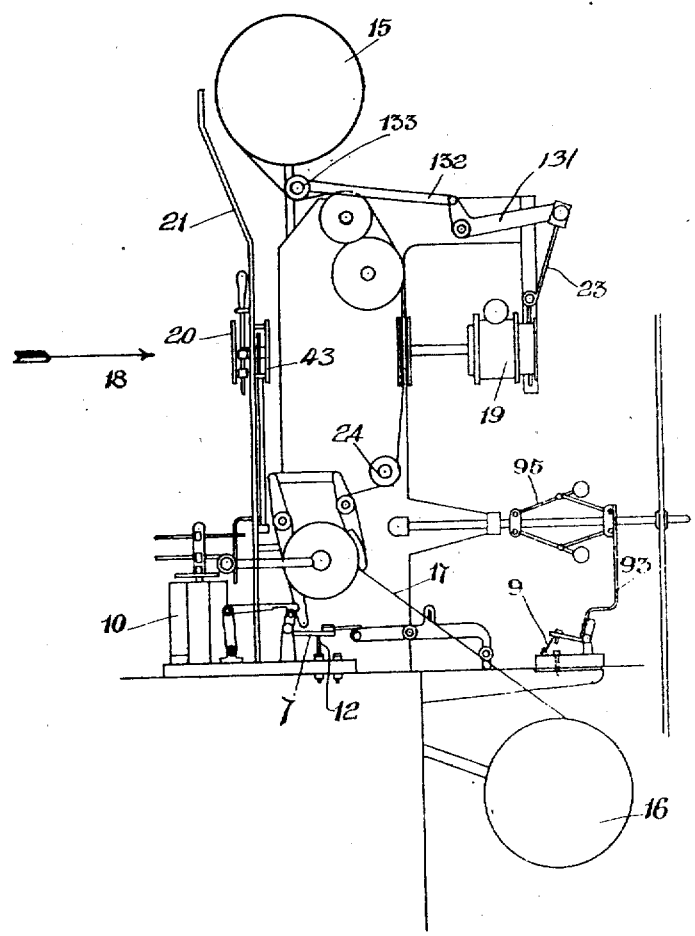
Figure 1 is a view in side elevation showing a projecting machine fitted with my invention.

Referring to Fig. 16 two independent electric circuits are shown one for the motor and projecting machine and the other for the hall lights.

The motor and projecting machine circuit contains an ordinary fuse 1, the motor 2, the motor speed regulating device 3, a switch 4 and a second fuse 5. The switch 4 is provided with means, such as a spring, whereby it is normally open. This circuit has a shunt circuit connected to it which operates when the switch 4 is open. The shunt circuit includes the fuse 1, the motor 2, the regulator 3, a switch 6, a switch 7, a switch 8, which is normally closed but which can be used for breaking the circuit when required, and the second fuse 5.

The motor circuit has also a second shunt circuit which includes the governor switch 9, an electro-magnet 10, and a resistance 11.

The hall lighting circuit includes a switch 12, a second switch 13, and the hall lights 14.

The conditions prior to starting a picture are as follows:—

Switches 12 and 13 are closed so that the hall lights are on. Switch 6 is open and switch 7 is closed. The governor switch 9 is open and switch 4 is open but switch 8 is closed. The device 3 is a speed regulator only and cannot be used for stopping the motor. Prior to starting a picture, it will be on the lowest speed.

Prior to starting a picture the film will be threaded through the projecting machine, the safety shutter will be closed, the intermediate shutter will be open and the lens shutter will be open and the light in the projecting machine will be on. The operator is unable to move the safety shutter as it is locked by mechanism hereinafter described.

In starting the picture the first operation is to close the switch 4 by hand and hold it closed, which causes the motor to run at a slow speed. The regulating device 3 is then operated to obtain the desired motor speed. When this speed is reached the governor switch 9 closes automatically, and electro-magnet 10 becomes energized. This electro-magnet serves through mechanism hereinafter described to release the locking device of the safety shutter. Further, when the electro-magnet 10 is energized the switch 6 closes automatically, so that both the shunt circuits of the motor circuit are now complete. The switches 6 and 13 are interconnected so that when the switch 6 closes, the switch 13 is automatically opened thus putting out the hall lights. When this has occurred the switch 5 is allowed to open, the motor and projecting machine now running on the shunt circuit.

The operator is now able to move the safety shutter. In doing this the shutter operating mechanism first closes the intermediate shutter. The safety shutter is then opened and is retained in its open position by a device controlled by the electro-magnet 10. The shutter controlling mechanism is then reversed and serves to open the intermediate shutter. When this has been done the picture will be on the screen.

Referring particularly to Fig. 1 the upper spool is shown at 15 and the lower spool at 16 and the film at 17. The light is placed in a position as indicated at 18 and the lens at 19. The safety shutter 20 is attached to a heat insulating plate 21 and the intermediate shutter 43 is on the opposite side of the plate 21. The lens shutter is shown at 23. The switches 6 and 13 are behind the electro-magnet 10 and the switches 7 and 12 are shown below the intermediate sprockets 24.

Referring particularly to Figs. 2, 3, and 4, the safety shutter 20 is shown in full lines covering an aperture 25 in the plate 21 and its alternative or open position is shown in dot and dash line. The shutter 20 is carried by a bar 26 pivoted at 27 to the plate 21. A spring 28 is provided attached at one end to the bar 26 and at the other end to a projection 29 on the plate 21. This spring tends to keep the shutter 20 in its closed position. Any other means for effecting this end may be used such for instance as a weight.

A lug 30 is provided upon the bar 26 and to this lug is pivotally attached a link 31 the other end of which is pivotally attached to a lever 32 pivoted to the plate 21 at 33.

The shutter 20 is normally kept locked in its closed position by a movable plate 34. This plate is bent as shown clearly in Fig. 4 and it is attached to a vertical rod 35 passing down the back of plate 21 and there supported in suitable bearings. An opening 36 is provided in the plate 21 in order that the plate 34 may project therethrough. Near the lower end of the rod 35 is fixed a bent rod 37 which projects through an opening 38 in the plate 21. A stop 137 is provided to limit the closing movement of shutter 20.

It will be seen from Figs. 2, 3 and 4, that the plate 34 normally serves to retain the bar 26 in the position shown in full lines. If however, the rod 37 is moved to one side the rod 35 will be partially rotated and thus move the plate 34 out of alinement with the bar 26 thus enabling the safety shutter to move. When the rod 37 is released it will automatically return to the position shown in full lines by reason of the fact that a weight 39 is provided suspended by a chain 40 passing over a pulley 41 which weight tends to keep the plate 34 in the position shown in full lines. A screwed adjustable stop 42 is provided to limit the motion produced by the weight 39. It should also be observed that when the locking plate 34 has been moved clear of the bar 26 in this way and the bar 26 has been moved by the opening of the shutter 20, and the plate 34 has been allowed to return to the position shown in full lines, when the bar 26 returns to its original position, the inclined edge at the end of the plate 34 will enable the bar 26 to knock it aside until the bar 26 has passed below the plate 34, when the plate 34 will quickly return to the position shown in full lines, and automatically lock the bar 26. In place of the weight 39 a spring or any other equivalent device may be used.

The intermediate shutter 43 is disposed upon the opposite side of the plate 21 from the safety shutter 20 and is shown in Fig. 5. This intermediate shutter consists of two sliding members 44 and 45 which operate to close the aperture 25 by sliding toward each other until their edges meet. This construction of shutter is well known and need not be described in further detail.

The operating mechanism for the shutters 43 and 20 is however novel and is shown clearly in Figs. 2, 5, 6, 7 and 8. This operating mechanism is mounted on a spindle 46 fixed in a bearing carried by the plate 21. The spindle 46 carries a three-armed lever 47. The two opposite arms of this lever are provided with projecting pins 48 which engage in slots 49 in the members 44 and 45. The third arm 50 of the lever 47 normally rests against a pin 51 upon a bell crank lever 52 which is also mounted on the spindle 46. The lever 52 is provided with a handle 53 and its other free end is provided with a roller 54 which is adapted when the lever is rotated, to come into contact with the free end of the lever 32.

The intermediate shutter 43 is provided with a spring 55 which tends to close the shutter, this spring being attached at one end to the lever 47 and at the other end to a pin upon the plate 21.

The lever 52 is provided with a spring pressed catch 56 which is pivoted to said lever at 57. This catch is provided with a handle 58 at its free end, this handle consisting of a piece of plate bent around the lever 52 and having lugs 59 upon each side of said lever which limits its motion. The catch is pressed by a spring 60 so that its normal position is that shown in full lines in Fig. 6. When in this position the catch 56 engages a pin 61 upon an adjustable collar 62 upon the spindle 46. The angular position of the pin 61 can be altered, at will, as it is locked to a collar 63 which is fixed to the spindle 46 by a set screw 64, the locking arrangement consisting of the pin 65 carried by the collar 63 and which can be adjusted into any one of the holes 66 in the collar 62.

It will be seen that in this arrangement the lever 52 is normally kept stationary by the engagement of the catch 56 with the pin 61, and the shutter 43 is normally kept open by reason of the lever arm 50 resting against pin 51. When it is desired to operate the two shutters (assuming the machine to be running and the locking plate 34 to have moved clear of the bar 26) the handle 58 of the catch 56 is moved to the position shown in dot and dash lines in Fig. 6 thus releasing the catch 56 from the pin 61. The handle 53 of the lever 52 can now be moved so that the pin 51 will allow the lever arm 50 to move under the tension of the spring 55. This movement is continued until the shutter 43 is completely closed. Further movement of the handle 53 brings the roller 54 into contact with the lever 32 (see Fig. 2) and continued movement will completely open the safety shutter 20. When this shutter is completely open it is retained in its open position by a device hereinafter described. The handle 53 is now moved back into its original position and as it does so the pin 51 engages the lever arm 50 and moves the lever 47 until the intermediate shutter 43 is completely opened. This shutter is locked open, by the catch 56 reëngaging the pin 61.

Referring to Figs. 9, 10, and 11 which show the electro-magnet 10, resistance 11, and the switches 6 and 13, and the connecting mechanism. The armature 65ª of the electro-magnet 10 is attached to a lever 66 pivoted at 67 to a small standard 68. The motion of the lever 66 is limited by a screwed stop 69 and the electro-magnet works in opposition to an adjustable spring 70. The free end of the lever 66 engages the end of a lever 71 pivoted at 72 to the standard 68. The other end of the lever 71 is connected by a link 73 to a bell crank lever 74 pivoted at 75 to a standard 76. The lever 74 is provided with two transverse rods 77, 78 and the other end of the lever 74 is provided with a transverse rod 79. A transverse lever 80 is provided, pivoted at 81 and provided with two pins 82, 83 and a weight or its equivalent 84 at one end. Upon the pivot 75 are mounted levers 88 and 86 carrying the switch members 6 and 13. Each switch member is provided with a properly insulated conducting member, adapted to make contact with a corresponding insulated conducting member fixed to the insulating base 85. The contacting points of these switches are preferably provided with platinum tips. Further in order to provide for the correct alinement of these contacts the levers 86 and 88 are each adjustable along the spindle 75 and also the members 6 and 13 are adjustable along the levers by which they are carried. The lever member 86 which carries the switch 13 is provided with a transverse pin 87, and the lever 88 which carries the switch 6 is provided with a transverse pin 89.

In operation this part of the apparatus works as follows:—

When the electro-magnet 10 is energized the armature 65ª is pulled down and is held down until the electro-magnet 10 ceases to be energized. When the armature 65ª is pulled down the other end of the lever 66 moves up as shown in dot and dash lines (Fig. 9). This enables the lever 71 to move into the position shown in dot and dash lines and the weight of its longer end together with the weight of the link 73 is sufficient to move the bell crank lever 74 into the position shown in dot and dash lines. The motion of this lever 74 is arrested by its coming into contact with the end of the lever 71. The effect of the lever 74 moving into its alternative position is to allow the transverse pin 79 to drop clear of the pin 83. This enables the transverse lever 80 to swing in its pivot 81 under the influence of the weight 84. When this motion has taken place the pin 83 will drop clear of the pin 89 thus allowing the switch member 6 to drop until it makes contact with its corresponding terminal upon the base 85. At the same time the pin 82 will engage with the pin 87 and raise the lever 86 thus opening the switch 13. When the electro-magnet 10 ceases to be energized the spring 70 causes a reversal of the action, the switch 6 being opened and the switch 13 being closed.

Figure 12:
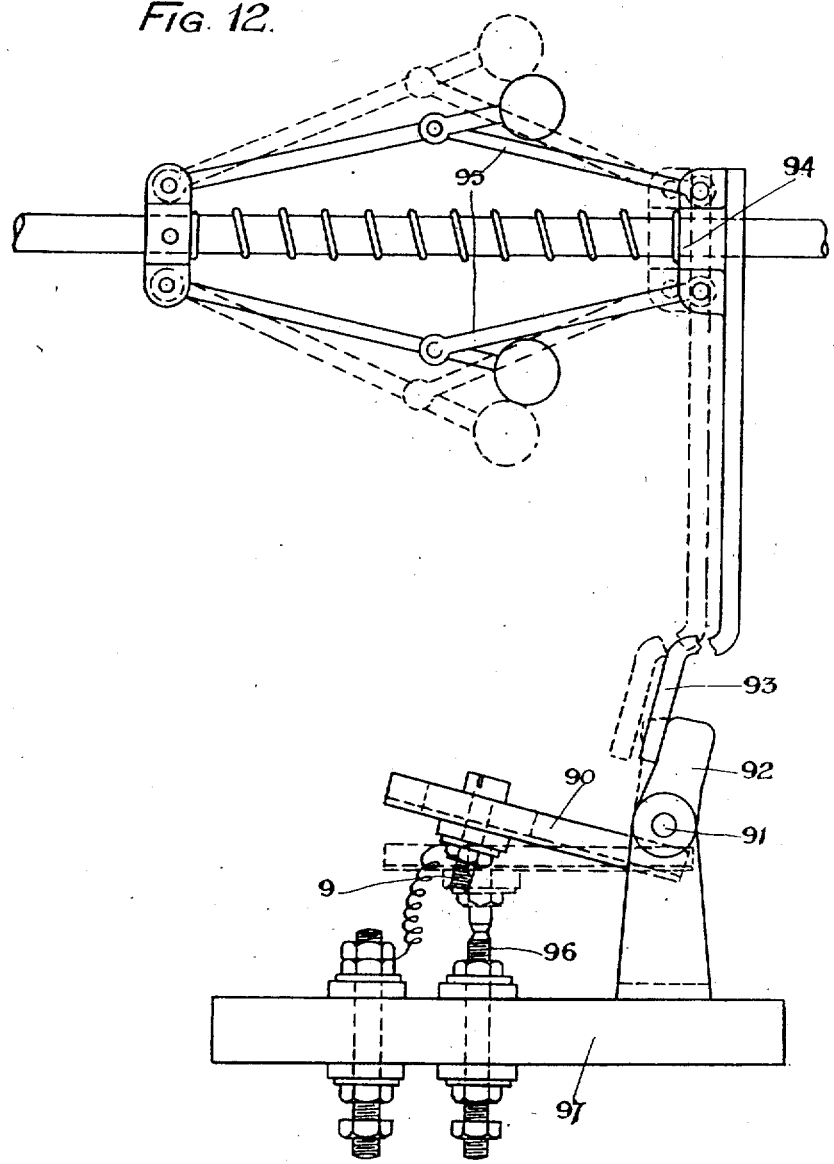
Fig. 12 is an enlarged detail view of the governor switch.

Referring now to Fig. 2 it will be seen that when the armature 65ª has been moved down and the lever 74 consequently moved into the position shown in dot and dash lines, the transverse pin 77 has moved into a position in which it supports the safety shutter 20 in its open position. Before the pin 77 reaches this position the pin 78 will have moved the rod 37 in a manner to unlock the plate 34 from the bar 26. It will be understood that the plate 34 is first released from the bar 26, the safety shutter is then opened by hand in the manner described and the pin 77 finally comes into place to support the safety shutter in its open position. Referring to Figs. 1 and 12 the governor switch 9 is carried by a lever 90 which is similar in construction to the levers 86 and 88. The lever 90 is pivoted at 91 and is provided with a second arm 92. The arm 92 is engaged by a rod 93 which is carried by the sliding part 94 of the governor 95. The governor 95 may be mounted on any convenient rotating spindle of the machine and it works by centrifugal action in the well known manner, the arrangement being such that the rod 93 keeps the switch 9 open until a predetermined speed has been reached when the rod 93 will move into the position shown in dot and dash lines enabling the switch 9 to drop and make contact with its corresponding terminal 96, fixed in the insulating base 97. If at any time during the running of the machine, the speed should decrease seriously, part 94 will slide so as to bring the rod 93 back into its original position and separate the contacts 9 and 96.

Referring to Figs. 13 and 14 which show the switches 7 and 12, the constructions of which are similar to that of the switches 6 and 13, it will be seen that these are mounted on an insulating base, immediately beneath a sprocket 129. Each of the switches 7 and 12 includes a lever, marked 100 and 99 respectively. These levers are mounted loosely side by side upon a pivot 101, mounted in a suitable standard 102. The lever 99 is provided with a transverse pin 103 which passes beneath the lever 100 the arrangement being such that the lever 100 can move up independently of the lever 99 but the lever 99 cannot move up without also lifting the lever 100.

The lever 99 is provided with a second arm 104 and this arm is provided with a transverse pin 105. A cranked lever 106 mounted on a spindle 107 and provided with a handle 108 is provided adjacent to the lever arm 104. As will be seen from a reference to Fig. 13 the lever 106 has a recess 109 upon its under side which is adapted to engage with the pin 105 when the lever 99 has been raised. The lever 106 in this way serves to support both levers 99 and 100 in their raised positions until the lever 106 is released by the operator by means of the handle 108.

Adjacent to the switches 7 and 12 and pivoted at 110 to a suitable part of the machine casing 111 are two levers 112 and 113. The lever 112 is curved as shown and provided with two slots 114 and 115. Adjustably secured in the slot 114 is the spindle 116 of a roller 117 which normally rests upon film 17. Adjustably secured within the slot 115 is a spindle 118 which projects from the plane of the lever 112.

The lever 113 has one end as shown beneath the spindle 118 while its other end is provided with a transverse pin 119 which lies beneath a pin 120 secured on the lever 100.

The arrangement is such that when that part of the film 17, which is beneath the roller 117 becomes slack or breaks, or when there is no film in position, the lever 112 drops into the position shown in dot and dash lines, thus allowing the spindle 118 to depress one end of the lever 113, thus causing the pin 119 to raise the lever 100 which carries the pin 120, thus opening the switch 7 without opening the switch 12.

Pivoted at 121 to a suitable part of the machine casing 111 is a lever 122 one end of which is adjacent to and capable of engaging with the transverse pin 105. The other end of the lever 122 is pivotally connected to a link 123 which is attached to a lever 124 pivoted to the machine casing at 125. The lever 124 has a curved member 126 attached to it, which fits around a portion of the film which is in contact with a sprocket 129. A roller 127 is provided mounted on a spindle 128 carried by the lever 124 and it will be seen that the film 17 passes over the intermittent sprocket 24 just before reaching the roller 127, then between the member 126 and the sprocket 129, and from there it passes beneath and supports the roller 117. It will therefore be seen that if a short length of film has its perforations torn at each side so that the intermittent sprocket 24 is unable to pull down any more film, the top spool 15 will continue to feed film and the bottom spool 16, will continue to pull down film. This will cause a tension in the lower part of the film which will pull against the roller 127 so as to move the levers 124 and 122 into the positions shown in dotted lines. When in this position the lever 122 will have moved the pin 105 thus raising the two levers 99 and 100 so as to open both switches 7 and 12. When in this position the pin 105 will engage in the recess 109 in lever 106 and will remain there until the lever 106 is released by the operator.

Figure 15:
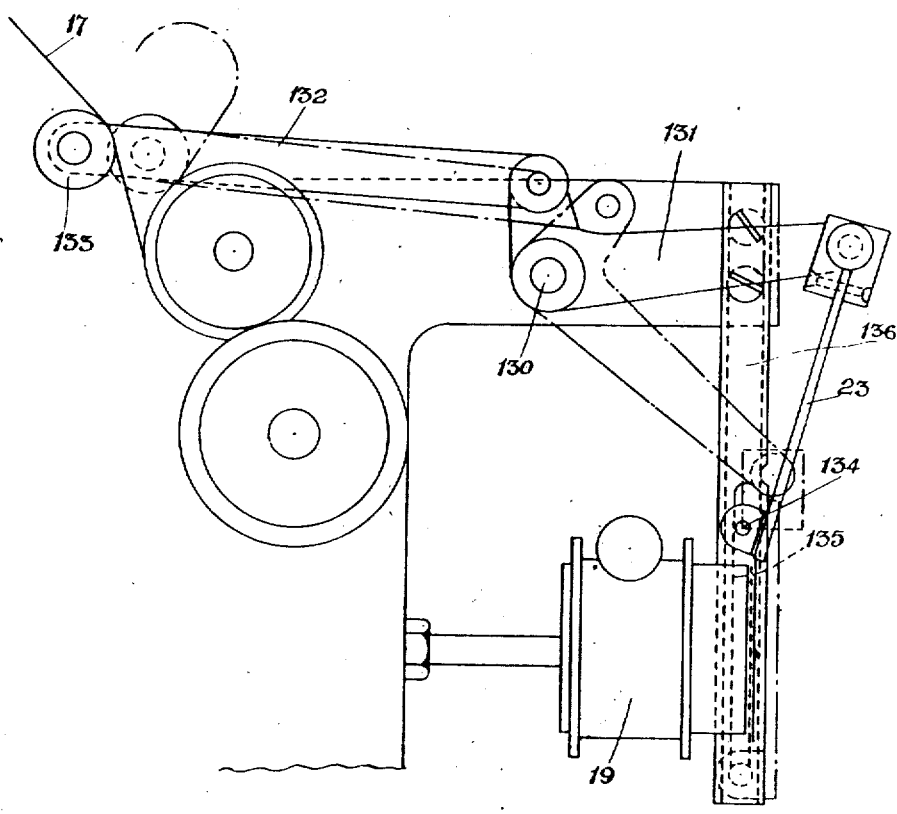
Fig. 15 is a side view showing the lens shutter and its operating means.
Figure 40:
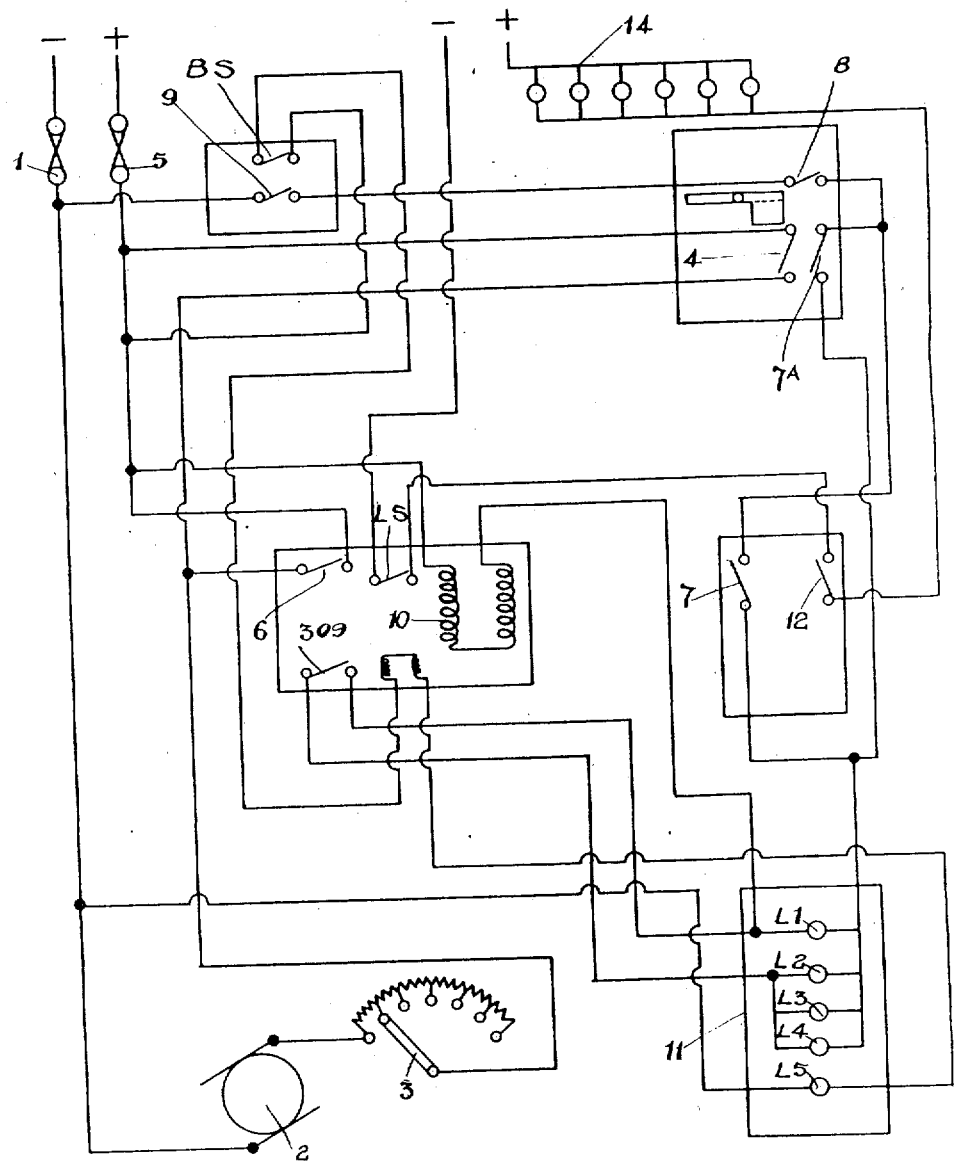
Fig. 40 illustrates a revised wiring diagram for the apparatus.

Referring to Fig. 15, pivoted at 130 to an extension of the machine casing is a bell crank lever 131, the vertical arm of which is pivotally connected to a link 132 which has a roller 133 at its end. The other end of the lever 131 is pivotally attached to the lens shutter 23. The lens shutter 23 is provided with a pin at 134 which works in a vertical slot 135 in a fixed guide member 136. A reference to Figs. 15 and 1 will show that the roller 133 is normally supported by the film 17 near the upper spool 15. When the end of the film leaves the spool 15 (see the dot and dash lines, Fig. 15) the roller 133 is released thus allowing parts 132, 131 and 23 to drop down into the positions shown in dot and dash lines, in which position the lens shutter 23 obscures the lens 19.

In operation the possibility of the film igniting owing to its being stationary or traveling too slowly when the light is on, is guarded against by reason of the fact that the safety shutter 20 will always close automatically immediately the current of the electromagnet 10 fails. Any defect in the motor or the belt drive or in the bearings of the projecting machine itself will immediately cause either a stoppage or such a slowing down of the governor 95 that the switch 9 will be opened and directly this occurs the armature 65ª will be released from the electromagnet 10 with the results that the lever 71 and link 73 will cause the lever 74 to return to the position shown in full lines in Figs. 9 and 2, thus bringing the rods 77 and 78 clear of the safety shutter 20 which closes automatically under the influence of the springs 28. Once this shutter has closed it becomes automatically locked by the plate 34 and it cannot again be unlocked or moved until the film has attained a safe speed. It will be understood that it is advisable for the essential parts of the safety shutter mechanism to be inclosed so that it will not be possible for the operator to release the locking plate 34 by hand. The automatic opening of the switch 9 will occur in any of the first four cases of danger hereinbefore summarized. Further the safety shutter 20 will be automatically released and will close should any defect develop in the coils of the electro-magnet 10.

Should the film break below the gate (see Fig. 13) the switch 7 will be opened as previously described without opening switch 12. A reference to Fig. 16 will show that the opening of switch 7 will bring about an immediate slowing down and finally a stoppage of the motor which causes the safety shutter 20 to close automatically at once. When this occurs the switch 6 will be opened and the switch 13 automatically closed as described with reference to Figs. 9, 10 and 11, so that the switches 13 and 12 are now both closed and the hall lights will consequently be turned on.

When the bottom spool fails to take up the film an exactly similar action takes place as the roller 117 will be allowed to drop owing to the slackness of the lower part of the film. In this case the danger is not an immediate one but it is inadvisable to have a length of film loose which is not being properly taken up on the spool.

The action when the film has a few perforations torn on each side has already been described with reference to Fig. 13. In this case both the switches 7 and 12 are raised thus causing a slowing down and finally a stoppage of the motor. When this stoppage occurs the motor switch 6 will be opened in the manner described with reference to Figs. 9, 10 and 11, and the switch 13 will be closed. As an interruption due to this cause is usually only a short one, the hall light will not be be switched on automatically. This will be prevented by the fact that in this case the switch 12 is open in addition to the switch 7.

In case a film should have been threaded in the machine and the operator should turn on the light before starting the film (which may occur if he has forgotten or is unaware that there is a film in the machine) no danger will arise as the safety shutter will be closed and it will not be possible for any one to open it until the film has attained a certain speed.

I will now describe certain modifications to the apparatus which have been illustrated in Figs. 17 to 40.

In carrying out my invention I may dispense with the spring on the operating lever 53 as shutter 43 normally is open owing to the tension of a spring.

Referring to Fig. 18, 180 is an extension of plate 21. 181, 182 are guides for sliding plates 183, 184 forming the intermediate shutter 43. These guides are fixed to plate 21 and extension 180 by screws; and distance tubes 185, 186 intervene between the guides and the plate 21, in order to allow the three armed lever 47 sufficient room to work in. This three armed lever is pivoted to the extension 180 of plate 21, the pivot screwing into the block 187 which is fixed to plate 180. The shape of the block 187 is shown in Fig. 19, and the slides 183, 184 of the intermediate shutter 43 are provided with projecting pins 188, 189. The ends of the two long arms of lever 47 have slots 190, 191, and the pins 188, 189 engage in these slots. A plate 192 is fixed over the guides 181, 182 by the nuts 193, 194. An opening is made in the plate 192 to allow the light rays to pass on to the machine. A spindle 195 is fixed to the block 187 by a pin 196. Fixed on the spindle 195 by a pin 199 next to the block 187 is a cam 197 the shape of which is shown in Fig. 20. Next to cam 197 is a collar or disk 198 which has a cam 200 as shown in Fig. 21. Next to disk 198 is a disk 202 with a projecting arm 203, Fig. 22. To the free end of the projecting lug is pivotally attached a link 212 the free end of which is pivotally attached to the free end of lever 32. Next to disk 202 is the operating lever 53ª, a pin 204 connecting this lever with the cam disk 198. Next to the lever 53ª is a collar 209 rigidly fixed to the spindle 195. On the face of the collar are a series of depressions 208 (Figs. 23 and 24) corresponding with the angular positions at A, B, C, D, E, Fig. 17. On the lever 53ª is a lug 205 on which is fixed one end of a flat steel spring 206 to the free end of which a button 207 is fixed. The lever 53ª will keep in any of the positions A, B, C, D, E, (Fig. 17) owing to the button 207 on the spring 206 being in one of the depressions shown in Fig. 23. When the lever is in any other position than A, B, C, D, or E, the button will ride on the face of the cheek or collar 209. A handle 210, (Fig. 18) is provided to make it more convenient to move the lever. The operator will know by the button clicking into one of the depressions that the lever has completed a movement.

The three-armed lever 47 is shown in its normal position in dotted lines in Fig. 19 and its short arm has a transverse pin on which is a roller 301, which works in a slot 213 made in the plate 180. The roller 301 rests on the cam disk 197, which raises this arm when the lever 53ª is moved down thus closing the intermediate shutter 43 against the tension of a spring fixed in a suitable manner.

The switch which takes the place of the one shown at 4, Fig. 16, comprises the following arrangement. A three armed lever 154 is pivoted at 33, i. e. the two levers 32 and 154 have a pivot common to both. The short arm of the three armed lever 154 rests on the disk 198. The end 155' of the lower one of the long arm has an insulated wipe contact which makes connection with an insulated stud fixed to plate 21.

The normal position of this lever is shown in full lines in Fig. 17 in which position the switch 4 is off. The end of the upper arm of lever 154 is pivotally attached to a link 164 the free end of which has a slot 166 (see Fig. 26) in which works a pin 162 fixed to a pawl 167 which is pivoted to plate 21 at 177. Spring 169 is attached to the pawl from underneath, and is fixed to bar 164 at 170. The safety shutter bar 26 is pivotally mounted at 27 (see Fig. 2) and adjacent the pivot is provided with a ratchet tooth 163 (Fig. 26). This tooth co-acts with pawl 167 to prevent pivotal movement of bar 26 until the pawl 167 is released by movement of the link 164. The purpose of the slot 166 is to enable the pawl to ride over the tooth 163 (see Figs. 17 and 26) when the safety shutter closes. The switch 4 will operate as follows. When the lever 53ª is moved down from C to B the short arm of lever 154 will ride on the cam 200, thus the end 155 will move to the right (Fig. 17) and so switch on the motor; at the same time the upper end of lever 154 will move the link 164. When the end of the slot 166 engages with the pin 162 the pawl 167 will be moved aside so as to clear the tooth 163 to enable the safety shutter 20 to be opened. When the lever 53 is moved back to position D or E the cam 200 (Fig. 21) will come away from under the end of the short arm of lever 154 which will move the end 155 to the off position, the pawl again coming against the hub of the safety shutter 20. A spring 158 keeps the short arm of the lever 154 always pressed against the disk 198.

The switch 8ª will take the place of switch 8, Fig. 16. To the cam 197 is fixed a pin 214 (Fig. 27) on the periphery thereof. The three armed lever 215 is pivoted to plate 180 at 218 the third arm 219 acting as a weight. A bell crank lever 216 is pivoted at 302 and has an insulated contact 303. The other contact 304 of switch 8ª is fixed to an insulated piece 217. the normal position of this switch is shown in full lines. This switch operates in the following manner:—

When the lever 53ª is moved down to the position D (Fig. 17) the pin 214 will press against the upper arm of the three armed lever 215 thus pressing back the short arm of the bell crank lever 216, and breaking the circuit which contains the switch 8ª. Preferably this switch is arranged to break the electromagnet circuit instead of the motor circuit. When the pin 204 moves to the position shown in dotted lines at 220 the end of it trips over the upper arm of the three armed lever 215 and so allows switch 8ª to close again. When the lever 53ª is moved back to E, the pin 214 will press the upper arm of the three armed lever 215 to the right and trip over it, but in this case nothing happens to the contacts of switch 8, owing to the lever arm of the three armed lever 215 being pressed away from the short arm of the bell crank lever 216. The three armed lever 215 will then return to its original normal position shown in full lines.

When starting the machine the operator is unable to move the safety shutter as it is locked in two places. Where it is locked by the pawl 167 engaging the tooth 163 I call the lock the shutter hub lock, and the other locking arrangement I call the shutter bar lock. The latter locking arrangement is shown in Fig. 17. A bell crank lever 138 is pivoted at 139 to plate 21. The long arm 140 acts as a weight. The end of the short arm has a transverse rod fixed at 150 against which rests the lever 74 when in the position shown in full lines in Fig. 2. The lever 168 is thus maintained in the position shown in full lines in Fig. 17 against the tension of a spring 307. A three armed lever 144 is pivoted at 145 to plate 21. The short arm of this lever acts as a weight to keep the lever always pressed against the set screw 149 screwing into an abutment 305 on plate 21. The upper arm of this lever has a notch and the lower arm moves free. The shutter bar has a pin 148 transversely fixed at the back. This arrangement is shown on Figs. 2, 3, and 4.

In starting the picture the first operation is to move the lever 53ª into position D. At this stage only switch 8 is opened and closed. The lever 53ª is then moved another step to C (Fig. 17). The intermediate shutter 43 is now completely closed. The lever 53ª is now moved to B which causes switch 4 to close the motor circuit and at the same time the shutter hub lock is unlocked. When the lever 53ª is moved from D to C, switch 8 is closed and remains closed until the lever 53ª is again moved down from E to D. The regulating device 3 (Fig. 16) is then operated to obtain the desired motor speed. When this speed is reached the governor switch 9 closes automatically and electro-magnet 10 becomes energized, the armature of which being attracted allows the lever 74, Fig. 9 to fall inward thus closing the motor switch automatically so that both of the shunt circuits of the motor circuit are now complete. Also the switch 13 is automatically opened thus putting out r nall lights. When the arm 74 falls inward it releases the pressure on the transverse rod fixed at 150 thus allowing it to fall inward as shown in dot and dash lines in Fig. 17. At the same time the short arm of lever 138 presses against the end of lever 144, the notched end of which comes away from the pin 148 thus allowing the safety shutter to be opened. The lever 53ᵃ is now moved to position A, in doing which the pin 204 commences to move the arm 203 which moves the lower end of lever 32 to the left thus opening the safety shutter.

The shutter will now remain open by resting on the rod 150. The controlling mechanism is then reversed by moving the lever 53ᵃ back to E in doing which switch 4 is opened pin 214 trips over the upper arm of lever 215 and the intermediate shutter is opened. When this has been done the picture will be on the screen.

If there are two pictures on one spool and the operator wishes to stop after the first picture, or if he should wish to stop for any reason whatever he has merely to move the lever 53 toward position D. This will partially close the intermediate shutter 43 and instantly close the safety shutter 20, by opening switch 8ᵃ so as to break the magnet circuit the machine will slow down until the governor switch 9 will open the magnet circuit and thus bring about an instant closing of the safety shutter. At the same time the hall lights will be switched on and the motor switched off. The operator could move the lever 53ᵃ to position C, but in doing so in one movement switch 8 will be off and on so rapidly that the motor would not have decreased its speed sufficiently for the governor switch 9 to act. There is no danger in this as the intermediate shutter will be completely closed. This movement may serve a useful purpose occasionally when the operator does not wish to show the last few feet of film on the spool. It is understood that by altering the position of the pin 214 (Fig. 27) the switching off of switch 8 could occur simultaneously with the closing of the intermediate shutter 43. In such case the first movement of lever 53ᵃ will be from E to C. The operator can allow the lever to remain at C in which position the intermediate shutter is completely closed, and when he starts the next picture he has merely to move the lever from C to A. thus putting back the lever from C to E when the picture came to an end. While a picture is on the screen the lever 53ᵃ must be at E (Fig. 17). From the above it will be seen that all the operator has to do is to move the lever 53ᵃ when he wants to stop, start etc.

A stop pin is fixed at 151 to plate 21 to limit the movement of lever 138 (Fig. 17). When the magnet circuit is broken the lever 74 will be thrown outward. In doing so it will push against the transverse rod fixed at 150 thus releasing the shutter and allowing it to close, at the same time moving clear of the lower end of lever 144, so enabling the shutter to be locked by the transverse pin 148 behind the safety shutter bar snapping into the notch 306 of lever 144.

Each locking device performs a distinct function. The shutter hub lock is opened mechanically by the operator moving down the lever 53ᵃ. The shutter bar lock is opened electrically by the governor switch.

Should the motor get out of order the projecting machine can be run by hand. In this case it will be absolutely necessary to place switch 7 in the magnet circuit instead of the motor circuit.

In running the machine by hand the operator commences by cranking the machine, and when a certain predetermined speed is attained he pulls down lever 53ᵃ in order to unlock the shutter hub lock. At the same time the intermediate shutter is completely closed; the shutter bar lock is unlocked owing to the magnet being energized by the governor switch 9. The operator then proceeds in the manner previously explained. If through any cause the operator ceases to crank the machine, as it slows down the governor switch 9 will open the magnet circuit, thus closing the shutter and putting on the hall lights.

In Fig. 30 is shown a modified arrangement of the resistance switch 309. Fig. 31 is an enlarged scale side elevation of the switch. Figs. 32 and 33 are enlarged details of the switch. Fig. 34 is an end view of the apparatus shown in Fig. 31. Two metal plates 225 are provided between which is a block of insulating material 227 with a slot through it for the contact screw. The slot permits of the adjustment of the contact screw. Pins 228, 229 fasten the plates to the block 227 and a spindle 233 is fixed at 234, to the upright 235. A third pin 230 is provided for securing plates 225 together. The switch arm thus formed turns freely on the spindle 233. On the spindle between the plates is the collar 231, rigidly fixed by the set screw 232.

To the upright 235 at 238 is pivotally attached a bell crank lever 236, the end of the short arm of which has a rod transversely fixed at 237. A metal plate 226 is bent at right angles and has side flanges B¹, B², and an end portion B³. The portion of the plate marked X which is shown in Fig. 33 has a slot through which passes a screw (not shown). Beneath the plates 225 is a washer (not shown) against which the screw is tightened so as to clamp the plate 226 in position. When 226 is fastened to 225 they become practically a bell crank lever. The reason of it being in two parts 226, 225 is to permit the position of plate 226 to be adjusted, so that it will just keep clear of the long arm of the bell crank lever 236 allowing lost motion between these parts. The rod fixed at 237 rests on the end of the lever 66, Fig. 30, shows the switch on. As soon as the magnet is energized lever 66 moves into the position shown in dot and dash lines (Figs. 9 and 30) thus the rod fixed at 237 is raised, the end of the long arm of 236 pushes 226 to the right, and so switches off some of the lamps of the lamp resistance (thereby increasing the resistance). The wiring is as shown in Fig. 29 the leads 239ª and 240ª being connected to 239, 240.

Fig. 34 shows the arrangement of plate 225 in end elevation looking in direction of arrow. This construction can be applied to switches, 6, 7, 9, 12, or 13, instead of the channel brass.

Fig. 35 shows an improved arrangement of the governor switch (see Fig. 12).

Fig. 36 is a plan of Fig. 35.

Referring to Figs. 35 and 36, a disk 241 is pivoted to the base at 244 on which it freely turns. From the disk is an extension or radial arm 245. At the edge of disk at 242 is fixed a vertical spindle 243. To the spindle on which the governor is fixed is fitted a collar 249 with a set screw, so that the tension of the governor spring can be adjusted. The part of the governor which slides on the spindle has a groove 250 in which recess is the vertical spindle 243. When the balls fly apart the spindle 243 being in the groove 250 will be pushed to the left, as shown in dot and dash lines, thus turning the disk on center 244 and the long arm 245 in the direction of the arrows. The long arm 245 moves clear of a short arm such as 92 Fig. 12, and thereby closes the switch 9.

At the end of 245 is fixed a block of insulating material 246, which has a light spring wipe contact which rubs over a contact stud suitably fixed to the base. As soon as the long arm 245 has moved in the direction of arrow, these contacts close a circuit to a bell or buzzer and so warns the operator that the magnet circuit is closed. When the arm 245 moves a little farther the bell or buzzer circuit is broken. This buzzer or bell will also act as an alarm in this manner. If a certain scene wants slowing down, and the operator slows down too much so that the lever 245 in moving in the opposite direction to the arrow, again closes the buzzer or bell circuit and the operator is warned that if the machine slows down any more the governor will open the magnet circuit and so interrupt the exhibition by the safety shutter closing and the hall lights being switched on.

From the foregoing it will be seen that the operator has simply to operate one lever, all functions (with the exception of one) being performed automatically. The one exception I refer to is the apparatus shown in Figs. 13 and 14 which show the switches 7 and 12. Referring to Fig. 13 it will be seen that if a short length of film has its perforations torn at each side both switches 7 and 12 are opened. When in this position the pin 105 will engage in the recess 109 in the lever 106 and will remain there until the lever 106 is released by the operator by hand. The present improvement provides means whereby this function will be performed automatically.

Referring to Figs. 37, 38, and 39, 251 is a bell crank lever which is pivotally attached to two short links, 252, 253, which are pivoted to plate 21, at 259, 260, the levers 251 passing through an opening 254 (see Fig. 39). Lever 106 (Fig. 13) is not required. When switches 7 and 12 are opened they will push forward the small arm of the bell crank lever 255, and will be engaged by the notch 258. The hall is now still in darkness owing to both switches 7 and 12 being open. After the operator has adjusted the film he pulls down the lever 53ª to start the motor. An arm of the three armed lever 154 closes the motor circuit and this lever 154 simultaneously closes switch 7ª which is normally open and is connected in parallel with switch 7, Fig. 40.

The short arm of lever 251 also rides on the cam 200 on disk 198, but in such a manner that it does not ride on the cam until the portion shaded comes under it. This is because the cam 200 is only half the width of the disk except the part shaded which is the full width of the disk.

When the machine speeds up the governor switch (Fig. 12) completes the magnet circuit thus putting into action the apparatus shown in Figs. 9 and 10. The shutter 20 will now be unlocked in both places and by this time the shaded portion of the cam 200, will raise the bell crank lever 255 the notched end of which will be thrown forward thus allowing switches 7 and 12 to close but the hall still remains in darkness owing to apparatus shown in Figs. 9, 10, having come into action. Simultaneously with the raising of lever 251 the shutter 20 is opened. The wiring diagram shown at Fig. 40 incorporates the improvement hereinbefore described. In this arrangement switch 309 switches off lamps L2, L3, and L4, of resistance 11 after the armature has been attracted by the magnet 10. Switch 7 instead of being in the motor circuit is in the magnet circuit; switch 8 instead of being in the motor circuit is in the magnet circuit. Switches 7ª and 4 are operated simultaneously by lever 154.

Switch 7ª is an addition as also is the switch B. S. which is in circuit with the buzzer. This circuit has a lamp resistance L5. The switch in the hall lamp circuit is marked L. S., and is operated in the manner described with reference to the switch 13 earlier in this specification.

Referring to the wiring diagram:—

The motor circuit contains 1, 2, 3, 4, 5. This circuit has four shunt circuits as follows:—

(1). (operates when 4 is open) contains 1, 2, 3, 6, 5.

(2). 1, 9, 8, (which is normally closed) 7, L1, 10, 5.

(3). (operates when 7 is open) 1, 9, 8, 7ª, (normally open) L1, 10, 5.

(4). (operates when machine runs below the desired speed) contains 1, L5, buzzer switch B. S. 5.

The hall light circuit includes switches L. S. 12 and the hall lights 14.

The conditions prior to starting a picture are as follows:—

Separate switches for the resistance L2, L3, and L4 for the hall lights have been provided for the following reason. As the function of switch 309 is to put in extra resistance in the magnet circuit by switching on L2, L3, L4, of resistance 11 if this switch were directly operated by lever 66, Fig. 9, the magnet circuit would not have sufficient time to be fully energized. Directly the electro-magnet felt the influence of the current, the switch would put on the resistance, and thus the armature might be pulled away because even the softest iron requires some appreciable time for the electric current to flow around it, to magnetize it to its full capacity. Switch 13 will not act until the armature has been fully attracted and is in contact with the poles of the magnet. It is understood that it is not necessary to have so many lamps, two lamps, one of high candle power i. e. passing a heavy current, and one of less candle power, i. e. passing a smaller current would serve the purpose. L5 is of much lower candle power than L1 as only a very little current is required to operate the buzzer. The switch L S is operated in the same manner as switch L. S. as earlier in this specification.

Switches 12 and L. S are closed, so that the hall lights are on. Switches 4 and 6 are open. Switch 9 is open. Switches 7 and 8 are closed. Switch 7ª is open. Switch 309 is closed and switch B. S. is open.

In starting the picture the first operation is to move the operating lever 58ª. When this lever comes to the position D, the intermediate shutter will be completely closed, when the lever comes to position C switch 8 will be opened (but nothing happens) because the function of this switch is to break the magnet circuit; but it cannot break the magnet circuit because the circuit is in an open condition owing to the governor switch 9 being open. When the lever comes to position B switch 8 will be closed also switches 7ª and 4 will be closed and the safety shutter will be unlocked by the pawl being pushed aside from the hub of the safety shutter. As the motor circuit is now complete the motor will start the machine running, and as soon as it has reached a certain predetermined speed the governor switch 9 will complete the magnet circuit and so energize the electro-magnet 10, which will operate the apparatus shown in Fig. 9, whereby the safety shutter will be unlocked. At the same time the lever which is operated by the governor will close switch B. S. and so indicate to the operator that he can open the safety shutter by a further movement of the lever 53ª from B to A. Switch 6 will be closed. Switch 309 will be opened (thus putting in more resistance in the magnet circuit). Switch L. S will be opened (thus putting out the hall lights) and a rod will come into position to support the safety shutter. The lever 53ª is now moved to position A and the safety shutter will now be opened and will be kept in the open position by being supported by the rod. A lever will also be operated to replace switches 7 and 12 in case they have been opened.

Lever 53ª is now reversed to position E. In the course of reversing it when it reaches position B the replacement lever 251 (for replacing levers of switches 7 and 12) will return to its normal position. When the lever reaches position C switches 4 and 7ª will be opened (both these circuits are now complete). Nothing happens between C and D but between the positions D and E the intermediate shutter will be completely opened. The picture will now be on the screen. If the operator wishes to stop at any time, he has simply to bring the lever 53ª to the position C whereby the intermediate shutter will be closed and switch 8 will open the magnet circuit, thus bringing about an instant release of the safety shutter through the operation of the apparatus as shown in Fig. 9 which at the same time automatically opens switch 6 (thus switching off the motor) and closes switch L. S. thus switching on the hall lights. Switch 13 will be closed but nothing happens because this switch which controls the resistance 11 is in the magnet circuit which has been opened by switch 8. As the machine slows down below a certain speed the buzzer switch will be closed and then a movement after the governor switch will be opened and the machine comes to a halt.

The magnet circuit is now open in two places 8 and 9. In restarting it would not be necessary to again reverse the lever to position E as by simply moving the lever to the next forward position, B, and then to A the picture will be again on the screen, as described above.

Should the operator allow the film to run to the end, as soon as the film end leaves the top spool box, the lens shutter, Fig. 15, will drop, a moment after switch 7 will open the magnet circuit.

What I claim as my invention and desire to obtain by Letters Patent is:—

1. A cinematograph projecting machine comprising a safety shutter, locking means normally keeping said shutter closed, a governor associated with the driving means of the machine, an electrically operated device for releasing said locking means, a switch operated by said governor when the machine reaches a safe speed, said switch being in the circuit of said electrically operated device, an operating member for said shutter, a switch associated with said member, said switch being located in a circuit the closing of which starts the driving means, said switch being closed by the initial movement of the operating member, further movement of the operating member being prevented by said locking means which prevents the shutter and the operating member from being moved until said locking means have been released by the electrically operated device.

2. The combination of a cinematograph projecting machine, a motor, a governor, a switch operated by said governor, an electro-magnet adapted to be energized when said switch is closed, a pair of switches controlled by said electro-magnet, one of said pair being in the hall lighting circuit and the other being in the motor circuit.

3. A cinematograph projecting machine comprising a safety shutter normally locked in a position in which it prevents the light rays from reaching the film, a manually operated intermediate shutter, operating mechanism for said intermediate shutter, means associated with said operating mechanism for controlling electric circuits containing a motor for driving the machine, and an electro-magnet for unlocking the safety shutter and for controlling hall lighting circuits.

4. A cinematograph projecting machine comprising a safety shutter normally locked, in a position in which it prevents the light rays from reaching the film, a manually operated intermediate shutter, operating mechanism for said intermediate shutter, means associated with said operating mechanism for controlling electric circuits containing a motor for driving the machine, and an electro-magnet for unlocking the safety shutter and for controlling hall lighting circuits, and means associated with said mechanism for opening said safety shutter after it has been unlocked.

5. A cinematograph projecting machine comprising a safety shutter normally locked, by two locking devices in a position in which it prevents the light rays from reaching the film, a manually operated intermediate shutter, operating mechanism for said intermediate shutter, means associated with said operating mechanism for controlling electric circuits containing a motor for driving the machine and an electro-magnet for unlocking the safety shutter and for controlling hall lighting circuits.

6. A cinematograph projecting machine comprising a safety shutter normally locked, by two locking devices, one adapted to be unlocked mechanically and the other electrically controlled, in a position in which it prevents the light rays from reaching the film, manually operated intermediate shutter, operating mechanism for said intermediate shutter, means associated with said operating mechanism for controlling electric circuits containing a motor for driving the machine and an electro-magnet for unlocking the safety shutter and for controlling hall lighting circuits.

7. A cinematograph projecting machine comprising a safety shutter normally locked in a position in which it prevents the light rays from reaching the film, a manually operated intermediate shutter, operating mechanism for said intermediate shutter, whereby said shutter must first be closed before the safety shutter can be opened, means associated with said operating mechanism for controlling electric circuit containing a motor for driving the machine, and an electro-magnet for unlocking the safety shutter and for controlling hall lighting circuits.

8. A cinematograph projecting machine comprising a safety shutter normally locked in a position in which it prevents the light rays from reaching the film, a manually operated intermediate shutter, operating mechanism for said intermediate shutter whereby said shutter must first be closed before the safety shutter can be opened, means associated with said operating mechanism for controlling electric circuit containing a motor for driving the machine, and an electro-magnet for unlocking the safety shutter and for controlling hall lighting circuits, and means associated with said mechanism for opening said safety shutter after it has been unlocked.

9. A cinematograph projecting machine comprising a safety shutter normally locked by two locking devices in a position in which it prevents the light rays from reaching the film, a manually operated intermediate shutter, operating mechanism for said intermediate shutter, whereby said shutter must first be closed before the safety shutter can be opened, means associated with said operating mechanism for controlling electric circuits containing a motor for driving the machine, and an electromagnet for unlocking the safety shutter and for controlling hall lighting circuits, and means associated with said mechanism for opening said safety shutter after it has been unlocked.

10. A cinematograph projecting machine comprising a safety shutter normally locked by two locking devices, one adapted to be unlocked mechanically and the other electrically controlled, in position in which it prevents the light rays from reaching the film, a manually operated intermediate shutter, operating mechanism for said intermediate shutter, whereby said shutter must first be closed before the safety shutter can be opened, means associated with said operating mechanism for controlling electric circuits containing a motor for driving the machine, and an electromagnet for unlocking the safety shutter and for controlling hall lighting circuits and means associated with said mechanism for opening said safety shutter after it has been unlocked.

11. The combination of a cinematograph projecting machine, a motor, a governor, an audible warning device associated with said governor, a switch operated by said governor, an electromagnet adapted to be energized when said switch is closed, a pair of switches controlled by said electromagnet, one of said pair being in the hall lighting circuit and the other being in the motor circuit.

12. A cinematograph projecting machine comprising a safety shutter, which is normally locked in a position in which it prevents the light rays from reaching the film, and locking mechanism which normally prevents said shutter from being moved, and means for unlocking said locking mechanism comprising a device operated by an electromagnet which is energized only when the machine has reached a certain predetermined speed, and an automatically varied resistance associated with said electromagnet.

ROY MARCUS GEYER.